(12) United States Patent
Chen

(10) Patent No.: US 10,758,776 B2
(45) Date of Patent: Sep. 1, 2020

(54) COLUMN-TYPE COMBINATION CLIMBING EXERCISE MACHINE

(71) Applicant: Ya-Chi Chen, New Taipei (TW)

(72) Inventor: Ya-Chi Chen, New Taipei (TW)

( * ) Notice: Subject to any disclaimer, the term of this patent is extended or adjusted under 35 U.S.C. 154(b) by 23 days.

(21) Appl. No.: 16/204,576

(22) Filed: Nov. 29, 2018

(65) Prior Publication Data
US 2020/0171346 A1    Jun. 4, 2020

(51) Int. Cl.
| | | |
|---|---|---|
| *A63B 22/04* | (2006.01) | |
| *A63B 21/00* | (2006.01) | |
| *A63B 71/00* | (2006.01) | |
| *A63B 21/015* | (2006.01) | |
| *A63B 22/00* | (2006.01) | |
| *F16D 49/10* | (2006.01) | |
| *F16D 65/14* | (2006.01) | |

(52) U.S. Cl.
CPC ........ *A63B 22/04* (2013.01); *A63B 21/00069* (2013.01); *A63B 21/015* (2013.01); *A63B 21/154* (2013.01); *A63B 21/4034* (2015.10); *A63B 21/4035* (2015.10); *A63B 21/4045* (2015.10); *A63B 22/001* (2013.01); *A63B 22/0005* (2015.10); *A63B 22/0025* (2015.10); *A63B 22/0046* (2013.01); *A63B 71/0054* (2013.01); *A63B 2022/0043* (2013.01); *A63B 2210/00* (2013.01); *F16D 49/10* (2013.01); *F16D 65/14* (2013.01)

(58) Field of Classification Search
CPC . A63B 23/00; A63B 21/4015; A63B 21/4029; A63B 21/4035; A63B 21/00072; A63B 21/0023; A63B 23/0355; A63B 23/0488; A63B 23/1236; A63B 2023/006; A63B 2210/50; A63B 2225/09; A63B 21/0628; A63B 21/0626; A61H 1/02; A61H 7/001; A61H 7/007; A61H 2201/1284; A61H 2201/1623; A61H 2201/1628; A61H 2201/1635; A61H 2201/164; A61H 2201/168; A61H 2201/1695
See application file for complete search history.

(56) References Cited

U.S. PATENT DOCUMENTS

| | | | | |
|---|---|---|---|---|
| 5,007,631 A | * | 4/1991 | Wang ................... | A63B 22/001 482/119 |
| 5,040,785 A | * | 8/1991 | Charnitski ........... | A63B 22/001 482/51 |
| 2019/0009129 A1 | * | 1/2019 | Liao Lai .............. | A63B 22/205 |

* cited by examiner

*Primary Examiner* — Loan B Jimenez
*Assistant Examiner* — Andrew M Kobylarz
(74) *Attorney, Agent, or Firm* — Egbert Law Offices, PLLC

(57) ABSTRACT

A column-type combination climbing exercise machine mainly includes: the bottom end of a stand frame provided with a ground seat; a column is locked with the stand frame through a locking component; two sliding chutes are respectively disposed at the opposite left and right sides of the column; two sliding seats are correspondingly disposed in the two sliding chute, each sliding seat is adjacent to the top thereof, and a handle and a pedal are respectively disposed at the two ends of the bottom; a first linkage mechanism is connected with the two sliding seats to form a mutually opposite lift-fall and linkage action; a damper is assembled in the ground seat; two connectors are respectively disposed in the two sliding a seat; and a second linkage mechanism makes the damper and the two sliding seats in a linkage relationship.

3 Claims, 5 Drawing Sheets

COLUMN-TYPE COMBINATION CLIMBING EXERCISE MACHINE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a climbing exercise machine, and more particularly to a column-type combination climbing exercise machine which is an innovative structure type revealer.

2. Description of Related Art Including Information Disclosed Under 37 CFR 1.97 and 37 CFR 1.98

At present, there are many types of exercise machines that are available in the market, such as a pedal exercise bike, a treadmill, a rowing machine, a sit-up exercise machine, a stepper and a climbing exercise machine; the type of climbing exercise machine is mainly discussed in the present invention.

Although a climbing exercise machine is similar to a stepper, both sides have two pedals for the user to step with the two feet, but the difference is at the pedal actuation type, and the two-side pedals of the stepper are usually located on the swing arm, the swinging state is performed along a fulcrum when actuating, and the two-side pedals of the climbing exercise machine move up and down in the reciprocating motion by the linear status along the vertical track.

However, the following problems are found still in the actual use experience of this structural type: when the swing arm is assembled in a conventional stepper, it cannot be accurately assembled at one time, and each component of the swing arm must be re-adjusted usually, so as to avoid the irregularity during running, and thus, the manufacturing cost of the conventional stepper is relatively increased.

Furthermore, the two-side pedals of the conventional stepper have excessive spacing. When the user performs the pedaling exercise on the conventional stepper, the distance between the two feet exceeds the width of the shoulder, which violates the normal motion posture of the human body as well as their swing spacing range, easily to cause motion damage due to long-term incorrect motion posture. In addition, it also causes the overall width of the conventional stepper to be large, making the overall volume slightly larger. In addition to occupying space, when packaging and handling, it will take up a large volume, which will inevitably increase its transportation costs.

BRIEF SUMMARY OF THE INVENTION

The present invention mainly aims to provide a column-type combination climbing exercise machine.

Based on the foregoing objective, the column-type combination climbing exercise machine of the present invention mainly comprises: the bottom end of a stand frame provided with a ground seat thereof to form the stand frame supported on the ground seat in an inclined angle; a column is a hollow tubular structure, and one side of the column extends outwardly with two convex portions at parallel interval each other. A containing groove is formed between the two convex portions, and the containing groove of the column is used for containing the stand frame, and the column is locked with the stand frame through one locking component at least; the two sliding chutes are respectively disposed at the left and right opposite sides of the column, and the notch of each sliding chute is disposed along the longitudinal direction of the column and penetrates the two ends of the top and bottom of the column, and the chute notch width is smaller than the inside width of the chute. The two sliding seats are correspondingly disposed in the two sliding chutes, each sliding seat is adjacent to the two ends of the top and bottom, which is respectively provided with a handle and a pedal, and correspondingly penetrates the notch of each sliding chute and protrude-extends from the outside of the column; and wherein each sliding seat is provided with plural sliding pulleys for each sliding seat to be stably and constrainedly disposed in each sliding chute; a first linkage mechanism includes a first rotating wheel, a second rotating wheel, a first chain and a second chain; the first rotating wheel and the second rotating wheel are respectively disposed at the top and bottom of the column at the corresponding upper and lower interval; the first chain is disposed in the first rotating wheel, and the two ends of the first chain are respectively extended downward from the position adjacent first rotating wheel and connected to the top of the two sliding seats. The second chain is disposed in the second rotating wheel, and the two ends of the second chain are respectively extended upwards from the position adjacent second rotating wheel and connected to the bottom of the two sliding seats, so that through the first linkage mechanism, the two sliding seats act in a lifting and lowering linkage to be opposite to each other. A damper is assembled in the grounding seat; two connectors are respectively disposed in the two sliding seats and adjacent to each pedal, and each connector passes through the sliding chute notch and extends in the direction of the damper; and a second linkage mechanism comprises two third rotating wheels, two fourth rotating wheels, a fixed pulley, two second chains and a steel rope; the two third rotating wheels are spaced apart from each other and coaxially disposed in the stand frame away from the damper; the two fourth rotating wheels are respectively are coaxially disposed at two opposite sides of the damper, and the two fourth rotating wheels are opposite to the damper in the unidirectional linkage. The fixed pulley is disposed at the position adjacent two third rotating wheels, and the steel rope is disposed in the fixed pulley and its two ends extend downward; one end of the two second chains is respectively disposed in the two fourth rotating wheels and extends upward from the position adjacent two fourth rotating wheels and connected with the two ends of the steel rope. The another end of the two second chains is respectively disposed in the two third rotating wheels and extends downward form the position adjacent two third rotating wheels and is connected with the two connectors, so that the damper and the two sliding seats show a linkage relationship.

With the innovative and unique design, the present invention is designed according to the prior art, and the structural design of each sliding chute is convenient for accurately and quickly arranging the sliding seat in the sliding chute, thereby reducing the working hours; furthermore each handle, each pedal, each sliding seat, the first linkage mechanism and the column are firstly connected correspondingly to form a complete and operable module, and then the module is mounted in the stand frame. At this time, it is only necessary to slightly adjust the relative tightness relationship between the connector and the second linking mechanism provided by each sliding seat, that is, to complete the assembly of the integral structure of the present invention, thereby avoiding the need for that the separate components of the conventional stepper are independently connected and assembled, and its swing arm structure must be constantly adjusted and collated during the assembly process, resulting in increased production costs. Furthermore, since the two sliding seats are disposed in the two sliding chutes provided in the column, the distance between the two sliding seats is effectively reduced, thereby shortening the distance between the two pedals connected to the two sliding seats, so that the space between the two pedals spanned by the two feet of the user can be reduced, to avoid the sports injuries caused by the conventional stepper, thereby providing a convenient and comfortable movement mode for the user. It is also possible to reduce the occupation width and the overall volume of the column-type combination climbing exercise machine. When the column-type combination climbing exercise machine is to be shipped, the occupied material volume can be reduced and the transportation cost can be reduced. The present invention is particularly practical and progressive.

DETAILED DESCRIPTION OF THE INVENTION

Figure 1:
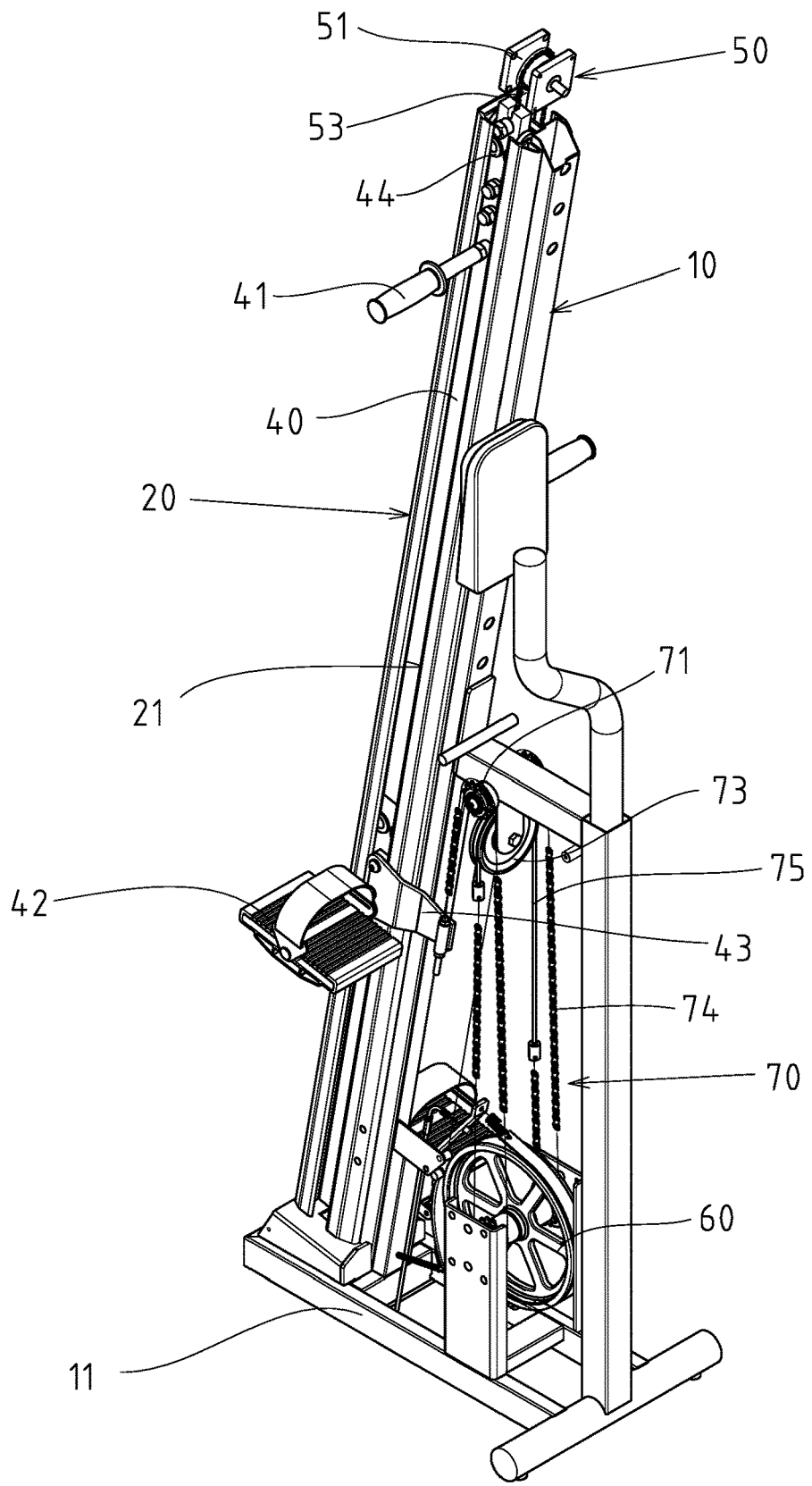
FIG. 1 is a combined three-dimensional diagram of a preferred embodiment of the present invention.
Figure 2:
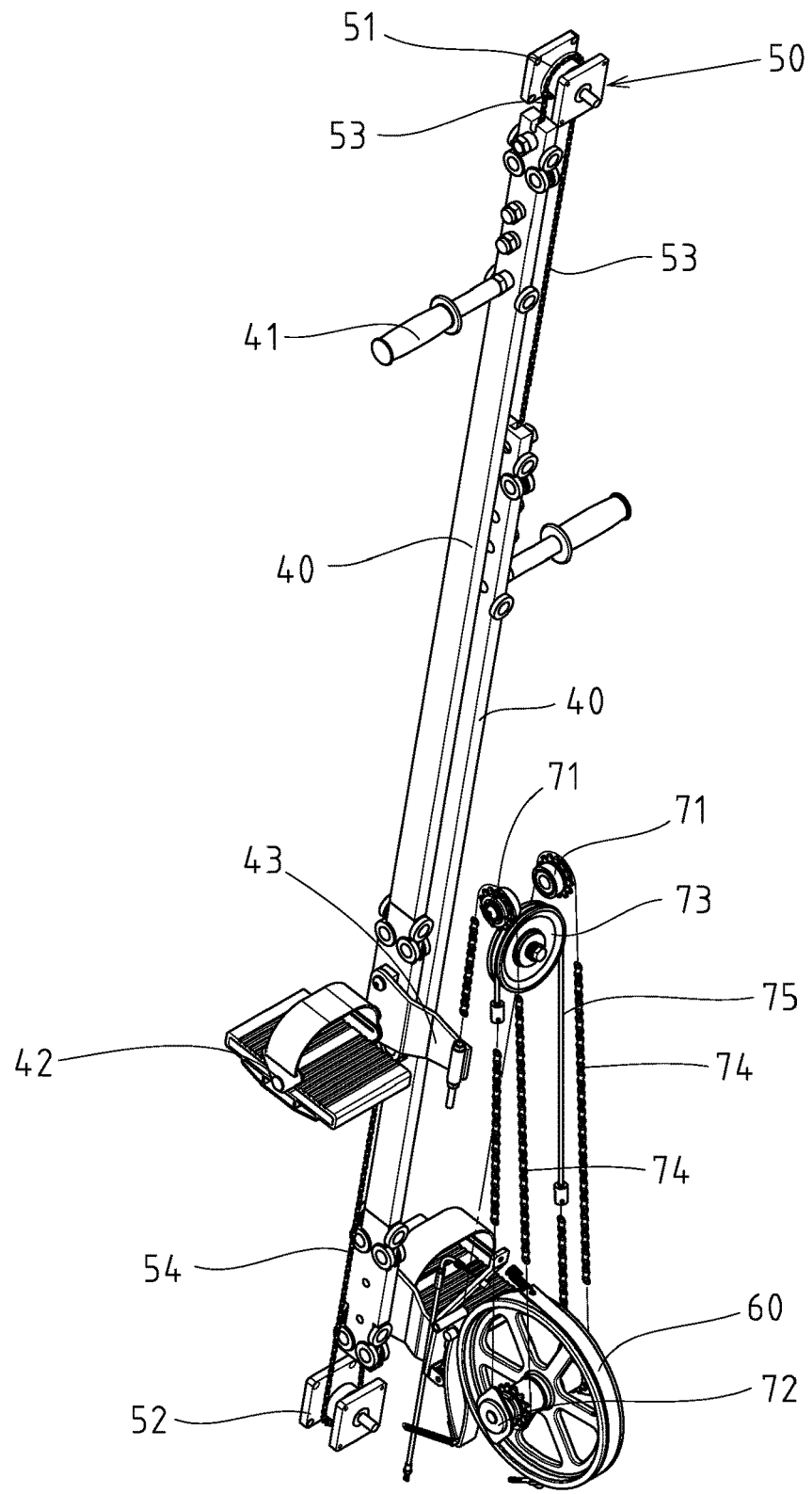
FIG. 2 is a decomposed three-dimensional diagram other than stand frame according to FIG. 1.

Referring to FIG. 1-FIG. 5 for the preferred embodiments of the column-type combination climbing exercise machine of the present invention, but the embodiments are for illustrative purposes only, and the patent application is not subject to the structure. The column-type combination climbing exercise machine includes: a stand frame 10, its bottom end provided with a ground seat 11; a column 20 locked with the stand frame 10 through a locking component 30; two sliding chute 21, respectively arranged at the opposite left and right sides of the column 20;?sliding seat 40, two sliding seats 40 are correspondingly disposed in the two sliding chutes 21, each of the sliding seats 40 is adjacent to its top thereof, and a handle 41 and a pedal 42 are respectively disposed at the two ends of the bottom; a first linkage mechanism 50 is connected with the two sliding seats 40 to form a mutually opposite lift-fall and linkage action; a damper 60 is assembled in the ground seat 11; two connectors 43 are respectively disposed in the two sliding seats 40; and a second linkage mechanism 70 makes the damper 60 and the two sliding seats 40 in a linkage relationship.

Said stand frame 10 is erected on the ground seat 11 at an oblique angle.

Said column 20 is of a hollow tubular structure, and one side of the column 20 extends outwards with two convex portions 22 in parallel with each other, and a containing groove 23 is formed between the two convex portions 22, and the containing groove 23 of the column 20 is used for containing the stand frame 10, and the column 20 is locked with the stand frame 10 through a locking component 30.

Figure 5:
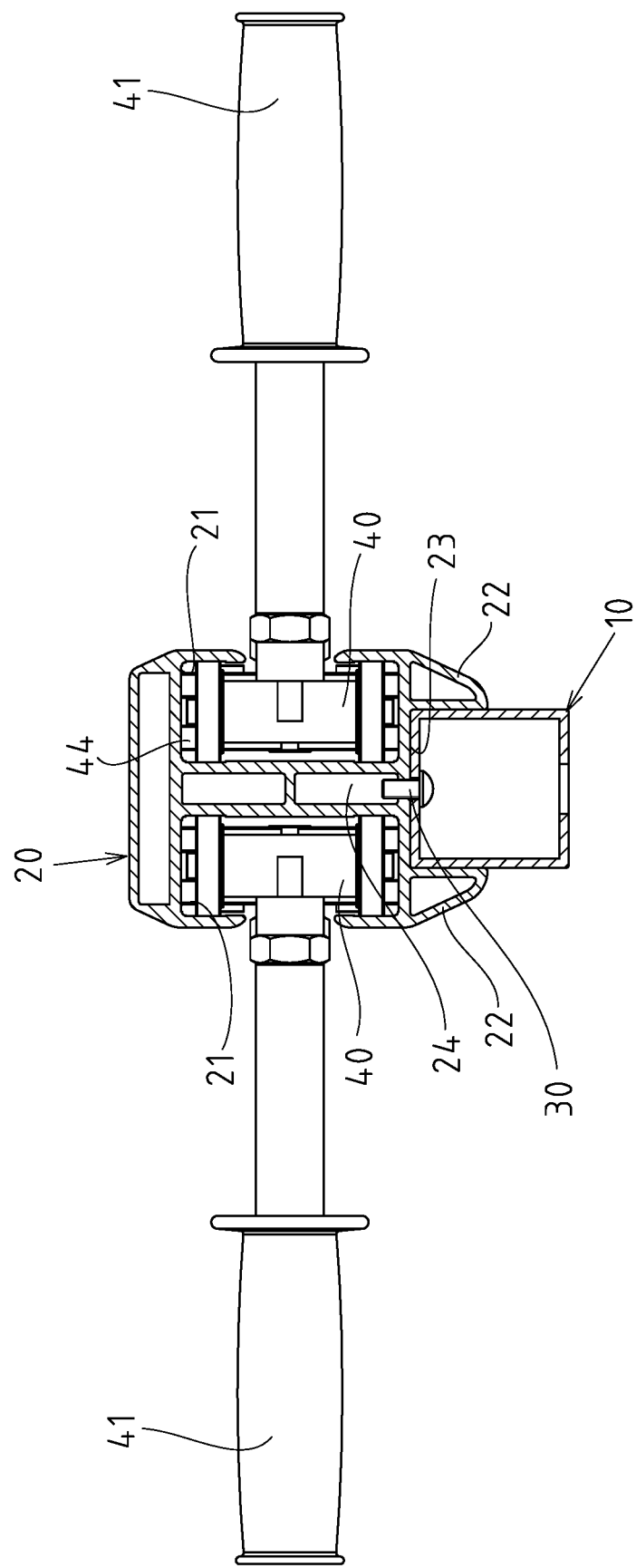
FIG. 5 is a sectional view of another view angle according to FIG. 1.

The notch of each sliding chute 21 is disposed in the longitudinal direction along the column 20 and penetrates the top and the bottom end of the column 20 (as shown in FIG. 1). Accordingly, since the handle 41 and the pedal 42 have been first mounted in the sliding seat 40; in the present invention, during that the sliding seat 40 is assembled to the sliding chute 21, the handle 41 and the pedal 42 smoothly follow the notch of the sliding chute 21, so that the sliding seat 40 is directly and accurately disposed in the sliding chute 21, thereby avoiding the alignment mounting hole caused by that the sliding seat 40 is first mounted in the sliding chute 21 and then the handle 41 and the pedal 42 is mounted, so the present invention has the effect of reducing the working hours. Moreover, the notch width of the sliding chute 21 is smaller than the width of the chute (as shown in FIG. 5), thereby avoiding that the sliding seat 40 is removed from the sliding chute 21, and a closed structure is formed between the sliding seat 40 and the sliding chute 21, so as to prevent the user's hand or other parts from jamming in the sliding chute 21.

Said handle 41 and the pedal 42 are disposed at a position adjacent to the top and bottom of the sliding seat 40, and protrude from the outside of the column 20 corresponding to the notch of each sliding chutes 21; and wherein each sliding seat 40 is provided with plural sliding pulleys 44 for that each sliding seat 40 is stably and limitedly disposed in each sliding chutes 21, so that each sliding seat 40 smoothly slides up and down in each sliding chutes 21. Furthermore, because the two sliding seats 40 are disposed in the two sliding chutes 21 provided in the column 20, which effectively reduce the distance between the two sliding seats 40, thereby reducing the occupied width of the column-type combination climbing exercise machine and its overall volume, when the column-type combination climbing exercise machine is shipped, it can reduce the occupied material volume and reduce the transportation cost.

Said first linkage mechanism 50 includes a first rotating wheel 51, a second rotating wheel 52, a first chain 53 and a second chain 54. The first rotating wheel 51 and the second rotating wheel 52 are disposed at the top and bottom of the column 20 at the corresponding upper and lower interval. The first chain 53 is disposed in the first wheel 51. The two ends of the first chain 53 are respectively extended downwards from the position adjacent to the first wheel 51 and disposed at the top of two sliding seats 40. The second chain 54 is disposed in the second wheel 52, and the two ends of the second chain 54 are respectively extended upwards from the position adjacent to the second wheel 52 and dispose at the bottom of two sliding seats 40, so that the two sliding seats 40 form a mutually opposite lift-fall and linkage action to each other through the first linkage mechanism 50.

In this example, the two connectors 43 are respectively disposed in the two sliding seats 40 and adjacent to the positions of each pedal 42, and each connector 43 passes through the notch of the sliding chute 21 and extends toward the damper 60.

The second linkage mechanism 70 includes two third rotating wheels 71, two fourth rotating wheels 72, a fixed pulley 73, two third chains 74 and a steel rope 75. The two third rotating wheels 71 are mutually spaced and coaxially disposed in a position of the stand frame 10 away from the damper 60. The two fourth rotating wheels 72 are respectively and coaxially disposed at two opposite sides of the damper 60, and the two fourth rotating wheels 72 are respectively and unidirectionally linked with respect to the damper 60. The fixed pulley 73 is disposed at a position of the stand frame 10 adjacent to the second rotating wheel 71, and the steel rope 75 is disposed in the fixed pulley 73 and its both ends extends downwards. One end of two third chains 74 are respectively disposed in two fourth rotating wheels 72, extend upward from a position adjacent to two fourth rotating wheels 72 and are correspondingly connected to the two ends of the steel rope 75. The another end of the two third chains 74 are respectively disposed in two second rotating wheels 71 and extend downward from the position adjacent to the two third rotating wheels 71 to be connected with the two connectors 43, so that there is a linkage relationship between the damper 60 and the two sliding the seats 40.

Furthermore, since each handles 41, each pedal 42, each sliding seat 40, the first linkage mechanism 50 and the column 20 of the present invention have been firstly assembled and connected with each other to form a complete and operable module, and then the module is mounted in the stand frame 10, and only the relative tightness between the connector 43 and the second linkage mechanism 70 provided by each sliding seat 40 is slightly adjusted, that is, the assembly of the integral structure of the present invention is completed. Therefore, it is avoided that the components of the conventional stepper should be separately connected and assembled, and the swing arm structure must be constantly adjusted and corrected during assembling, thereby causing an increase in production cost.

Figure 3:
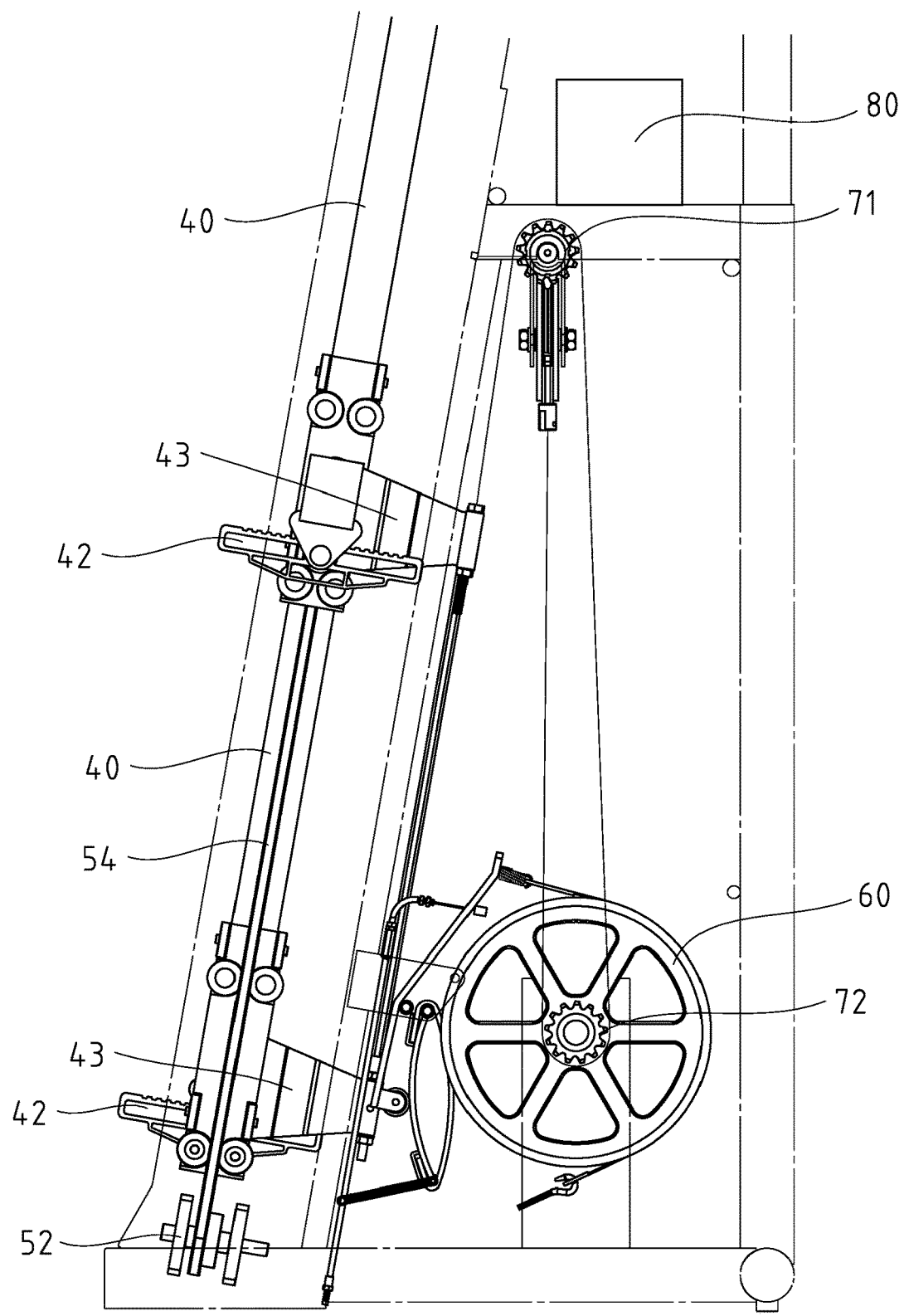
FIG. 3 is a partial sectional view according to FIG. 1.
Figure 4:
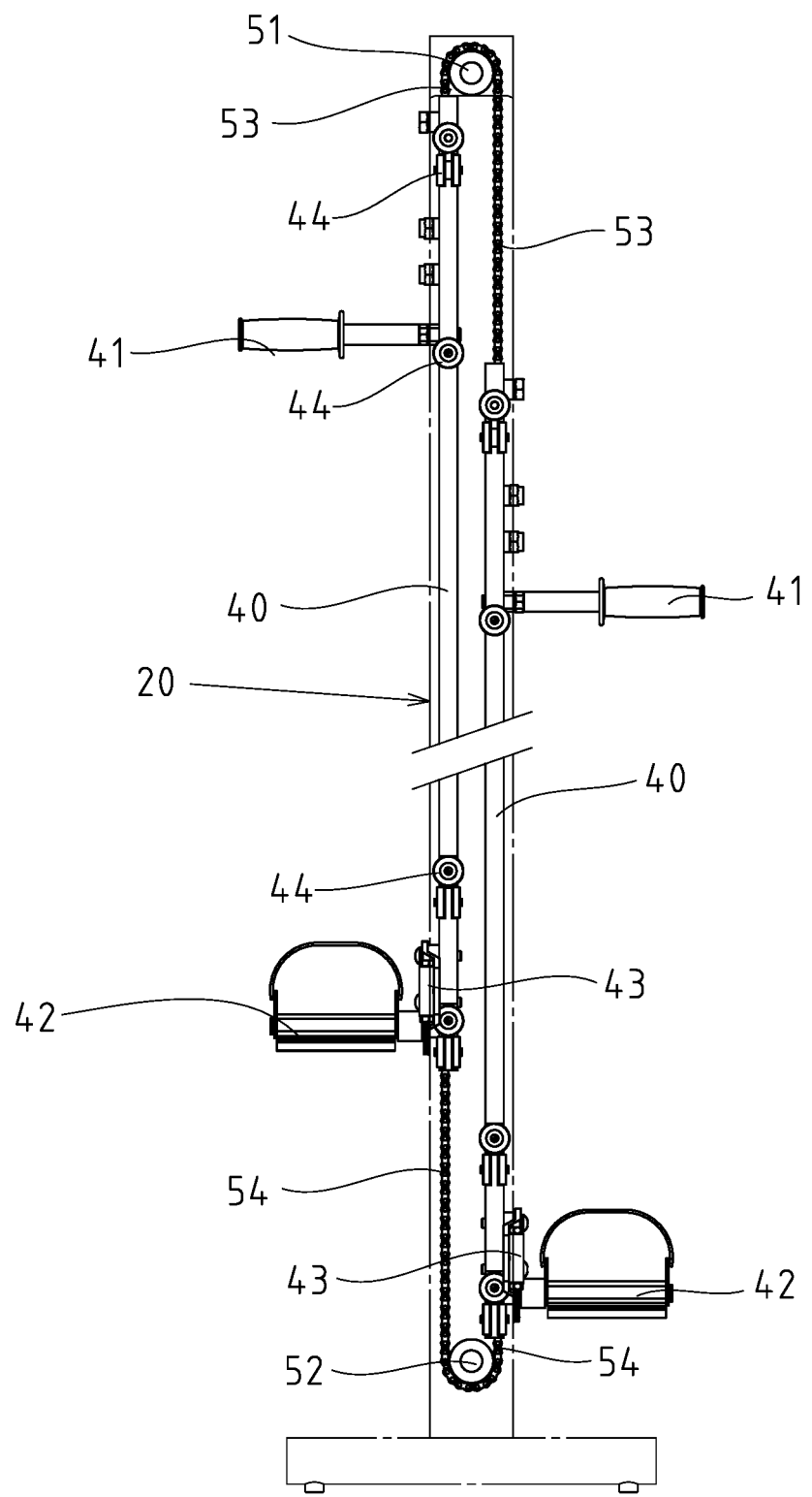
FIG. 4 is a sectional view of another side according to FIG. 1.

As shown in FIG. 3, in this example, the damper 60 is equipped with a speed changer 80 to control the damping strength of the damper 60.

As shown in FIG. 5, in this example, there is an interval space 24 inside the column 20. At least one locking component 30 extends through the stand frame 10 and the column 20 and protrudes into the interval space 24.

With the above structural composition, the operation of the present invention will be described as follows: as shown in FIG. 1, the user steps up and down on the two pedals 42, since the two sliding seats 40 are disposed in the two sliding chutes 21 provided in the column 20, which can effectively reduce the distance between the two sliding seats 40, thereby shorten the distance between the two pedals 42 dispose in the two sliding seats 40, therefore, it can reduce the distance between the user's two feet across the two pedals 42, so as to avoid the sports injuries caused by the conventional stepper, thereby provide a convenient and comfortable movement mode for the user.

I claim:

1. A climbing exercise machine comprising:
    a stand frame having a ground seat at a bottom end thereof, the ground seat inclining said stand frame;
    a column formed of a hollow tubular structure, said column having one side extending outwardly with a pair of convex portions at parallel intervals to each other, said column having a containing groove formed between the pair of convex portions, said containing groove containing said stand frame therein, said columns being locked to said stand frame by a locking component;
    a pair of sliding chutes respectively disposed on opposite sides of said column;
    a pair of sliding seats respectively disposed in said pair of sliding chutes, each of said pair of sliding seats being adjacent respectively a top and a bottom of said column, each of the pair of sliding seats having a handle and a pedal, each of said pair of sliding seats respectively penetrating said pair of sliding chutes so as to protrude from an exterior of said column, each of said pair of sliding seats having a plurality of sliding pulleys so as to allow each of said pair of sliding seats to be stably constrained and disposed in each of said pair of sliding chutes;
    a first linkage mechanism having a first rotating wheel and a second rotating wheel and a first chain and a second chain, the first rotating wheel and the second rotating wheel being respectively disposed at the top and the bottom of said column, the first chain being disposed in the first rotating wheel, the first chain having ends respectively extending downwardly from a position adjacent the first rotating wheel and connected to a top of said pair of sliding seats, the second chain disposed in the second rotating wheel, the second rotating wheel having ends respectively extending upwardly from a position adjacent the second rotating wheel and connected to a bottom of said pair of sliding seats, said pair of sliding seats acting in a lifting and lowering manner and opposite to each other through the first linkage mechanism;
    a damper connected to the ground seat;
    a pair of connectors respectively disposed in the pair of sliding seats and adjacent to each of the pedals, each of said pair of connectors respectively passing through said pair of sliding chutes and extending in a direction of said damper; and
    a second linkage having a pair of third rotating wheels and a pair of fourth rotating wheels and a fixed pulley and a pair of third chains and a steel rope, the pair of third rotating wheels being spaced apart from each other and coaxially disposed in said stand frame away from said damper, the pair of fourth rotating wheels being coaxially disposed at an opposite end of said damper, the fixed pulley being positioned adjacent the pair of third rotating wheels, the steel rope being disposed in the fixed pulley and having ends thereof extending downwardly, one end of the second chain being disposed in the pair of fourth rotating wheels and extending upwardly therefrom and connected to the ends of the steel rope, another end of the pair of third chains being disposed in the pair of third rotating wheels and extending downwardly therefrom and connected to said pair of connectors such that said damper and said pair of sliding seats are linked.

2. The climbing exercise machine of claim 1, wherein said column having an interval space therein, the locking component extending through said stand frame and said column and protrudes into the interval space.

3. The climbing exercise machine of claim 2, wherein said damper has a speed charge adapted to control a damping strength of said damper.

* * * * *